UNITED STATES PATENT OFFICE.

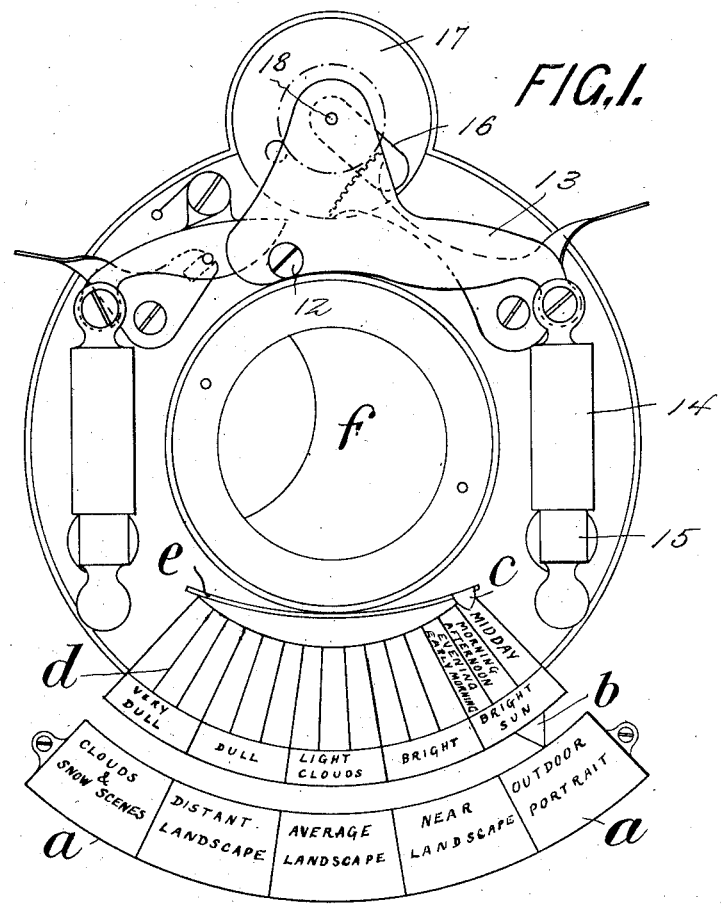
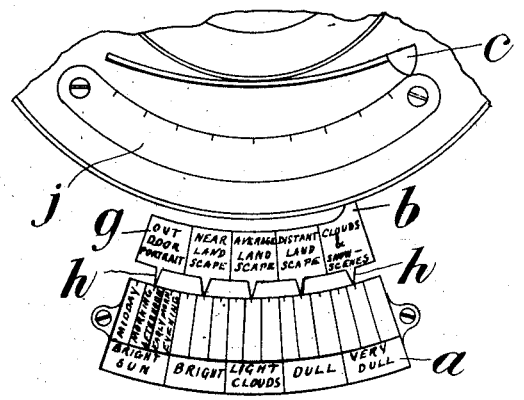

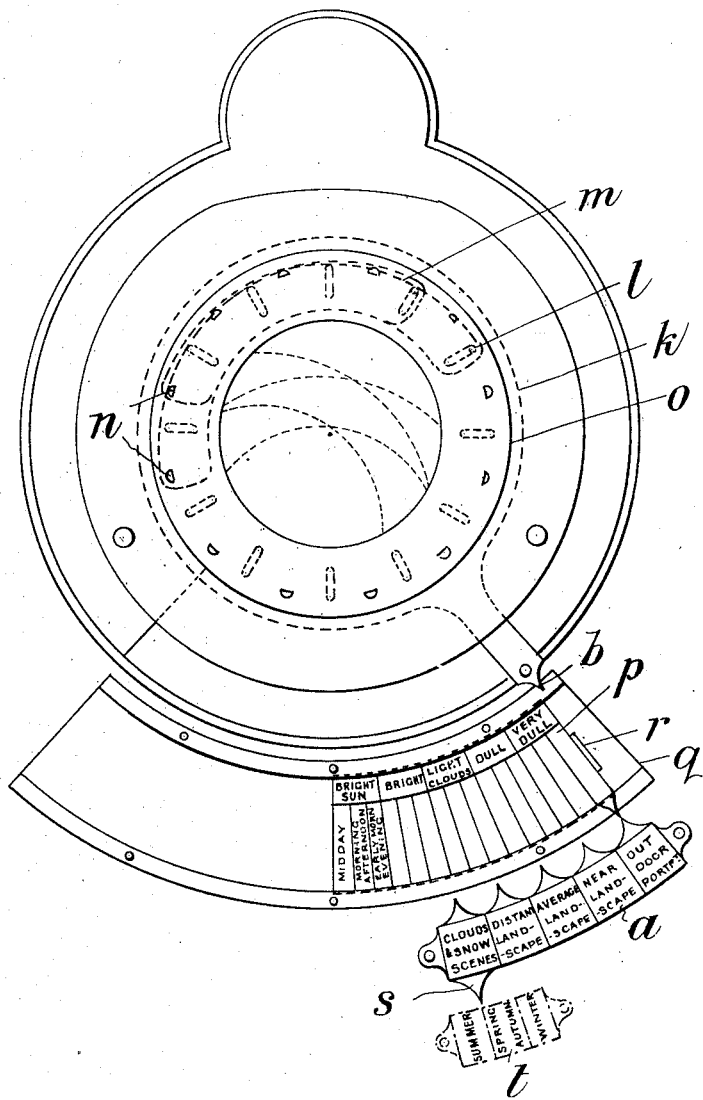

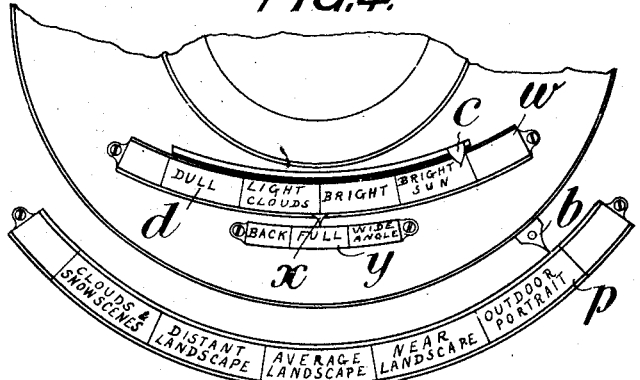
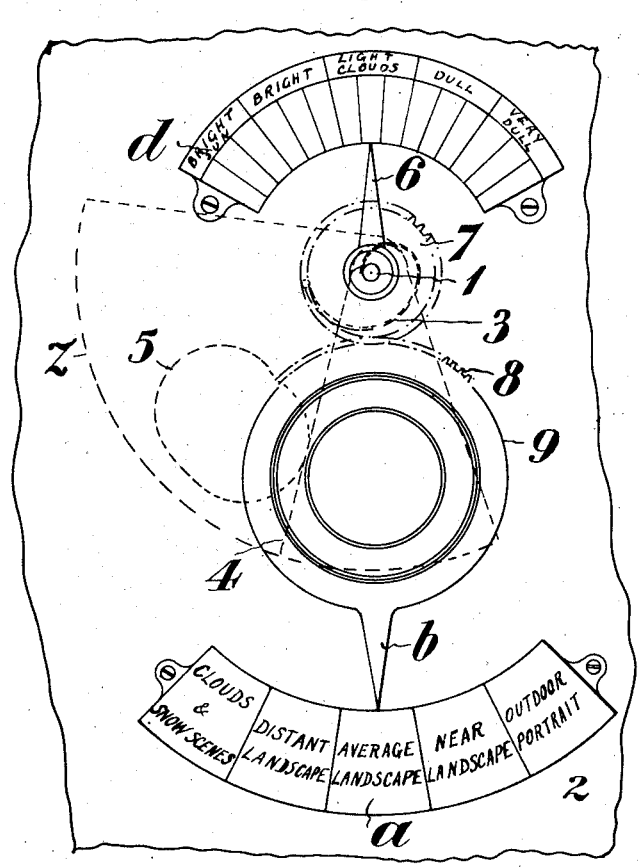
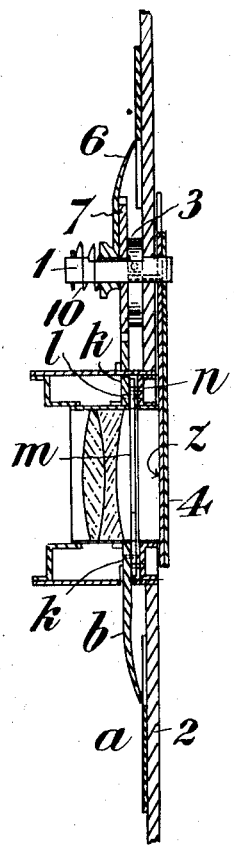

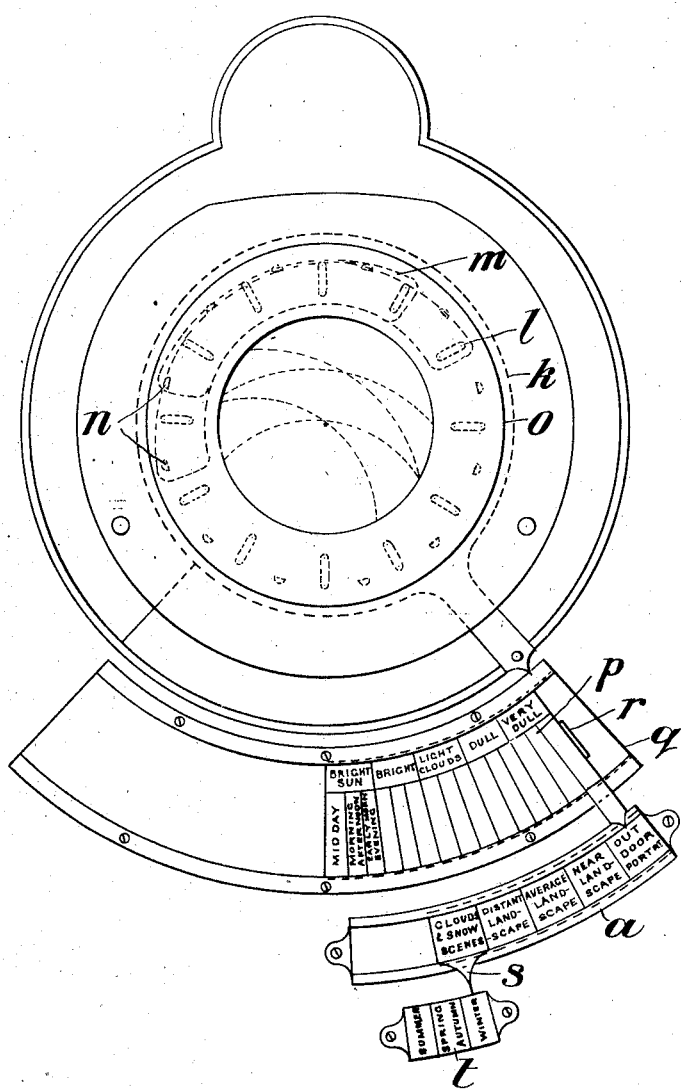

FRANK S. ANDREWS, OF LONDON, ENGLAND, ASSIGNOR TO ELMER FRANCIS CASSEL, OF LONDON, ENGLAND.

PHOTOGRAPHIC CAMERA.

No. 883,607.   Specification of Letters Patent.   Patented March 31, 1908.

Application filed March 3, 1904. Serial No. 196,415.

*To all whom it may concern:*

Be it known that I, FRANK S. ANDREWS, a citizen of the United States, residing at No. 47 Ladbroke Grove, Notting Hill, London, England, have invented new and useful Improvements in or Connected with Photographic Cameras, of which the following is a specification.

This invention relates to improvements in and connected with stops or shutters for the lenses of photographic cameras or with both the stops and the shutters whereby an unskilled person can properly expose a photographic plate without previous knowledge and it consists in the use of a scale or scales in connection with a photographic shutter for, or with the stops of, a lens, or with both shutter and stops, on which scale or scales the quality of light, the classification or kind of picture to be taken and any other conditions affecting the size of aperture or the length of exposure is or are indicated in words instead of figures, the whole being so calculated and arranged that the mechanism affecting the stop or shutter can be properly set by the operator without calculation or reference to exposure tables.

The invention may be carried out in several ways and Figure 1 of the accompanying drawings is a front elevation of a lens and shutter mechanism to which is applied a simple arrangement for carrying out this invention. Fig. 2 is a view of a portion of a lens and lens mount to which is applied a modification for merely regulating the size of the aperture. Fig. 3 is a front view of a lens, lens mount and iris diaphragm mechanism to which another modification is applied. Fig. 4 is a view of a portion of a lens and lens mount having applied thereto a further modification whereby the size of the stop can be regulated and the speed of the shutter varied according to the particular conditions existing. Fig. 5 is a front view of another lens and lens mount having an iris diaphragm and an oscillating shutter applied thereto the two latter being provided with the improved devices for enabling their ready adjustment. Fig. 6 is a central vertical section of Fig. 5 and Fig. 7 is a view similar to Fig. 3 showing a further modification.

Referring to Fig. 1, the front, say, of the camera or some other part fixed thereto is provided with a scale $a$ having a number of divisions marked with such indications as "Outdoor portrait", "Near landscape", "Average landscape", "Distant landscape", "Clouds and snow scenes". The pointer $b$ for causing the movement of the iris diaphragm is adapted to be moved to any one of the divisions marked on the scale and the size of the aperture for admitting the rays of light to the lens is thereby adjusted. In order to be able to vary the length of exposure according to circumstances the pointer $c$ is moved and consequently the speed of action of the shutter is varied in a known manner as follows: The pointer $c$ is situated upon one end of a bent lever whose other end is pivoted at 12 to a connecting piece 13 pivotally connected at one end to a cylinder 14 which can slide upon a plunger 15 and at the other end to a link 16 which is pivotally connected at 18 to the operating disk 17. In the position seen in Fig. 1 the pivotal connection 18 is concentric with the disk 17 and consequently, as the disk 17 partially revolves when the shutter operates, the link will idly move or pivot about said pivotal connection 18. When however the pointer $c$ Fig. 1 is moved to the left hand the connection 12 is raised thereby making the connection 18 eccentric to the disk 17, so that when the latter revolves the link 16 transmits a pull to the piece 13 which thus moves about its pivot 12 and causes the cylinder 14 to move down over the plunger 15, the resistance of the air between the cylinder 14 and plunger 15 retarding the movement of the shutter. Of course this invention could be applied to any other shutter regulating and operating mechanism for instance to that large class of apparatus in which the speed of the shutter depends upon the adjustment of the tension of a spring. The regulating part of the shutter a spring being provided with said pointer $c$ a scale $d$ is provided according to this invention for indicating the position of the pointer $c$ said scale having a number of divisions indicating for example "Bright sun", "Bright", "Light clouds", "Dull" and "Very dull", and each of these divisions is again subdivided into say, three marked for example "Midday", "Morning afternoon" and "Evening early morning". Assuming for instance it is desired to photograph a distant landscape on a dull day in the early morning, the pointer $b$ is moved till it points to "Distant landscape" and by this movement of the pointer *b* to the left in Fig. 1 the aperture may be made comparatively small. The pointer *c* belonging to the shutter *f* is then moved in its slot *e* Fig. 1 to the third subdivision in the fourth division marked "Dull" and the photographic plate may then be exposed with the knowledge that the exposure will be made with approximately the correct aperture of lens and speed of shutter.

According to a modification and as shown in Fig. 2, the camera front or some other part fixed thereto is, for example, provided with a scale *a* wholly or partly surrounding the lens mount, and having a number of divisions marked with such indications as "Bright sun", "Bright" "Light clouds" "Dull" and "Very dull". Each of these divisions may also be divided up into at least three subdivisions marked for example, "Midday" "Morning afternoon", and "Evening early morning". The diaphragm pointer *b* is formed as, or has attached thereto a scale *g* each division of which has a pointer *h* and the divisions in the said scale *g* are marked for instance, respectively, "Outdoor portrait", "Near landscape", "Average landscape", "Distant landscape" "Clouds and snow scenes". Assuming for instance, it is desired to take a portrait outdoors on a bright day at midday, the pointer *b* for adjusting the iris diaphragm is moved until the pointer *h* corresponding to "Outdoor portrait" on the scale *g* is opposite the subdivision marked "Midday" on the part of the scale *a* indicated by the word "Bright." The plate may now be exposed with the correct aperture and in this instance the speed of the shutter may have been previously adjusted by movement of the pointer *c* over an ordinary time scale *j* or the shutter might be of the non-adjustable kind.

According to Fig. 2 a modification of the invention is shown as applied to an iris diaphragm of the well known kind, in which a ring *k* is pivotally connected by pin and slot connections *l* with leaves *m* of the diaphragm said leaves being pivoted at their opposite ends *n* to a fixed ring *o*. The aperture is made smaller by moving the pointer *b* which turns the ring *k* which brings the leaves more or less into the position across the lens as indicated by dotted lines. The scale over which the pointer moves is now marked *p* and is made movable in a guide *q* about the same axis as that about which the pointer *b* moves or thereabouts, and the scale *a* with the words "Outdoor portrait" "Near landscape" "Average landscape" "Distant landscape" "Clouds and snow scenes" or other appropriate wording is fixed and placed outside and concentric with the scale *p* which indicates the state of the light such as "Bright sun" and so on. This device has two movements, the scale *p* is first moved, say by a thumb piece *r*, until the pointer on the scale *p* points say to "Outdoor portrait", "Near landscape" or whatever it may be on the fixed scale *a* and then the pointer *b* is set to the division on the scale *p* which indicates the conditions of light and if desired to the subdivision of such division which indicates the time of day. If desired the scale *a* may also be made movable and be provided with a pointer *s* and there may be a fixed scale *t* (as shown in Fig. 7) marked for example "Summer" "Spring" "Autumn" and "Winter" so as to consistently allow for larger aperture when the light is not strong and the contrary.

According to another modification and as shown in Fig. 4 the pointer *b* attached to the diaphragm ring *k* Fig. 3, is adapted to be moved to point to one or other of a number of divisions on a movable scale 11 marked say "Outdoor portrait" and so on, as aforesaid, and provided with a pointer *u* which points to one or other of a number of divisions on a fixed scale *v* marked to represent the time of the day, for instance "Midday", "Morning afternoon" and "Early morn evening" or naturally the hours might be specified. The scale *v* might be movable and a further scale provided for adjustment according to the time of the year as indicated in Fig. 3.

The scale *d* for the speed pointer *c* may be made movable in a guide *w* and be provided with a pointer *x* and there may be a fixed scale *y* marked with different lens indications such as "Wide angle" "Full" meaning full combination and "Back" meaning back combination.

Fig. 5 represents a well known shutter mechanism in which an oscillating sector *z* is pivotally mounted on a stud 1 rotatably mounted on the wall 2 of the camera, a spring 3 is fixed at one end to the stud 1 and at its other end to shutter *z*. By turning the stud 1 therefore the spring is adjusted to exert more or less power upon the shutter for closing it. A supplementary sector 4 is movably mounted on the stud 1 behind the sector *z* for the purpose of covering the aperture 5 in said sector *z* when the latter is being set in the well known manner. The various detents and releasing devices are not shown as they may be of any convenient kind and their application to the shutter is well known. The iris diaphragm mechanism may be similar to that shown in Fig. 3.

The pointer 6 for indicating the adjustment of the spring 3 is mounted on a toothed wheel 7 and said pointer 6 and said wheel 7 are connected to the stud 1 by a feather and feather way. The tooth wheel 7 gears with teeth 8 on a ring 9 connected through the pointer *b* with the ring *k* which operates the diaphragm leaves *m*. The said wheel 7 and pointer 6 are movable in the direction of the axis of the stud 1 upon the latter. The scale d is marked "Bright sun", "Bright" "Light clouds" and so on and each division is subdivided into say three subdivisions marked "Midday" "Morning afternoon" and "Early morn and evening". The scale a is marked "Outdoor portrait" and so on.

The operator first puts the wheel 7 out of gear with the teeth 8 on the ring 9 by sliding the pointer 6 and wheel 7 along the stud 1 against the action of the spring 10 and the time of exposure and the aperture are first adjusted by means of the pointers 6 and b respectively but if the operator desires subsequently to use his judgment he may, after throwing the wheels into gear again, revolve the toothed wheel 7 which will simultaneously open or close the aperture more or less and produce a correspondingly quicker or slower speed, thus an operator might set the pointers to the position shown in Fig. 5 to meet the corresponding conditions and when about to take the photograph a quickly moving object might appear within the field of the lens necessitating a sudden adjustment to increase the speed of the shutter. If the wheels be in gear then by moving the pointer 6 to the left hand in Fig. 5, the pointer b will be simultaneously moved to the right hand and the aperture will be adjusted correctly to correspond with the speed without any calculation or trouble on the part of the operator and without any loss of time.

From the foregoing it will be observed that I have provided means for controlling the relative size of the lens aperture and the length of time of the exposure, and that I adjust said controlling means with relation to different actinic qualities of subject and gradations of light, whereby a uniform actinic action is secured. I have found that the best practical results are secured with the scales or gradations of light and subject inversely related, as by that means the uniform actinic results that are sought are assured, the relation of the scales being such that the speed of the shutter is increased to conform to an increase in the size of the aperture. I do not, however, desire to limit myself to this precise arrangement. It will also be noted in this connection, that where I refer in the claims to a relative adjustment of speed and aperture I mean any means by which the parts are brought into proper relation to secure uniform actinic results under all conditions.

It will be understood that while I have shown and described means for adjusting the speed of the shutter with relation to classified gradations of light, and means for adjusting the aperture with relation to classified gradations of subjects, I do not desire to limit myself in this particular, as it is quite obvious that these conditions might be reversed without departing from the spirit of my invention. It is well known for instance, that the total amount or quantity of light passing through the shutter is the product of the size of the aperture multiplied by the length of time it is open. This being so, it is clear that the speed of the shutter may be just as readily adjusted with relation to classified gradations of subject, and the aperture adjusted with relation to classified gradations of light, and hence I consider both forms to be within the scope of my invention.

What I claim as my invention and desire to secure by Letters Patent is:—

1. The combination with a photographic shutter, of means for indicating the relative adjustment of the speed and aperture of said shutter with regard to the actinic values of light and subject.

2. The combination with a photographic shutter, of means for indicating the relative adjustment of the speed and aperture of said shutter with regard to the actinic values of light and subject, and means for adjusting said shutter to conform to said indicating means.

3. The combination with a photographic shutter, of means for indicating the relative adjustment of the speed and aperture of said shutter with regard to inversely related classified gradations of light and gradations of subject.

4. The combination with a photographic shutter, of members for controlling the adjustment of the speed and aperture mechanism of said shutter, and means for indicating the relative positions of said members with regard to the actinic values of light and subject.

5. The combination with a photographic shutter, of a pointer for adjusting the speed mechanism of said shutter, means for adjusting the aperture of said shutter, and means for indicating the relative adjustments of speed and aperture of said shutter with regard to the actinic values of light and subject.

6. The combination with a photographic shutter, of means for adjusting the speed mechanism of said shutter, a pointer for adjusting the aperture of said shutter, and means for indicating the relative adjustments of speed and aperture of said shutter with regard to the actinic values of light and subject.

7. The combination with a photographic shutter, of means for indicating the relative adjustment of the speed and aperture of said shutter with regard to scales bearing classified gradations of light and classified gradations of subject, said scales being relatively proportioned and relatively adjustable.

8. The combination with a photographic shutter, of means for indicating the relative adjustment of the speed and aperture of said shutter with regard to scales bearing classified gradations of light and classified gradations of subject, said scales being relatively proportioned, one of said scales being adjustable and the other stationary.

9. The combination with an apparatus for exposing a sensitized photographic medium, of means for indicating the relative values of classified gradations of light, and classified gradations of subject, and means for effecting the adjustment of said apparatus with respect to said indicating means.

10. The combination with a photographic apparatus of means for varying the quantity of utilized light, means for indicating the relative actinic values of said utilized light with relation to classified gradations of subjects, and means for adjusting said varying means with relation to said classified gradations of subject, whereby a uniform actinic result is obtained.

11. The combination with a photographic apparatus of means for controlling the size of the lens aperture and the length of time of the lens opening, means for indicating the relative sizes of aperture and time of opening with relation to different actinic qualities of subject and gradations of light, whereby a uniform actinic action is secured, and means for adjusting said controlling means with relation to said indicating means.

In testimony whereof I have signed my name to this specification in the presence of two subscribing witnesses.

FRANK S. ANDREWS.

Witnesses:
  H. D. JAMESON,
  F. L. RAND.